United States Patent
Wisecarver

[15] 3,661,431
[45] May 9, 1972

[54] GUIDE WHEELS AND TRACKS

[72] Inventor: Warren R. Wisecarver, Walnut Creek, Calif.

[73] Assignee: Bishop-Wisecarver Corporation, Pittsburgh, Calif.

[22] Filed: Aug. 24, 1970

[21] Appl. No.: 66,388

[52] U.S. Cl. .................................308/6 R, 16/87 R, 16/105
[51] Int. Cl. .............................................F16c 19/49
[58] Field of Search .................308/6, 3.8; 16/44, 87, 91, 16/96, 105, 98, 106, 86.1

[56] References Cited

UNITED STATES PATENTS

| | | | |
|---|---|---|---|
| 3,105,272 | 10/1963 | Tucker | 16/105 |
| 755,607 | 3/1904 | Bischoff | 16/106 |
| 3,287,759 | 11/1966 | Foltz | 16/87 R |
| 3,541,922 | 11/1970 | Dunlap | 308/6 R |
| 1,537,067 | 5/1925 | Card | 308/6 |

FOREIGN PATENTS OR APPLICATIONS

| | | | |
|---|---|---|---|
| 464,431 | 8/1928 | Germany | 308/6 |
| 267,345 | 6/1950 | Switzerland | 308/3.8 |
| 824,164 | 12/1951 | Germany | 308/6 |
| 893,966 | 3/1944 | France | 16/105 |

Primary Examiner—Martin P. Schwadron
Assistant Examiner—Ronald H. Lazarus
Attorney—George B. White

[57] ABSTRACT

Guide wheels with eccentric adapter bushings to provide precision attachment relatively to tracks. Each guide wheel is formed in a double V which provides four inclined circular surfaces permitting use both in horizontal and vertical position and adapted to co-operate with tracks of suitable angles both by the enclosed central groove and by the two outside inclined annular surfaces. The eccentric nut and bolt permits the accurate shifting of the wheel for precision adjustment. The mounting surfaces of the track are accurate and held to close tolerances and are interchangeable.

6 Claims, 9 Drawing Figures

INVENTOR
WARREN R. WISECARVER
BY George B. White
ATTORNEY

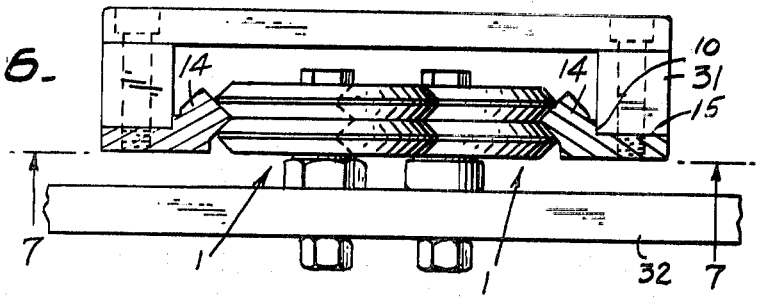
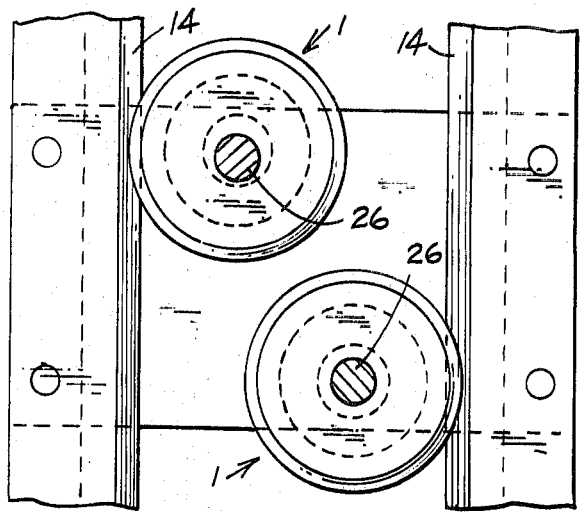
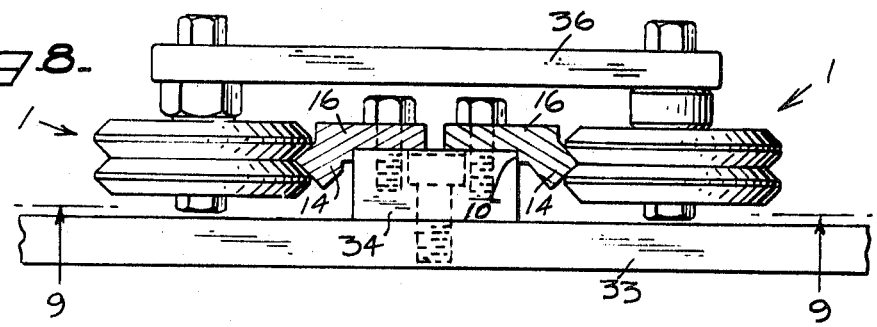
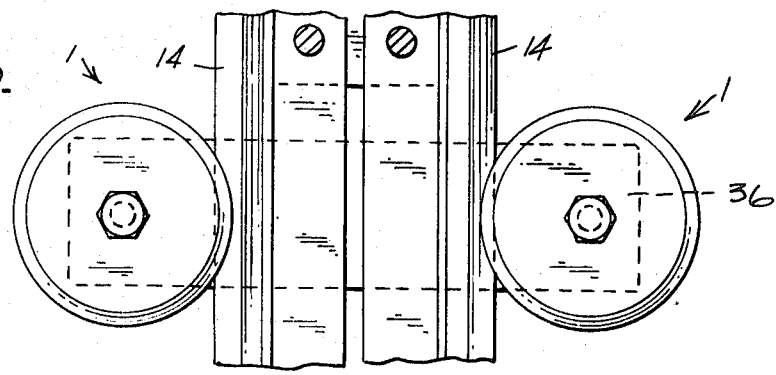
INVENTOR
WARREN R. WISECARVER
BY George B. White
ATTORNEYS

GUIDE WHEELS AND TRACKS

BACKGROUND OF THE INVENTION

The principle of wheels moving on tracks is old in the art. Guide wheels with V-shaped central groove around the middle of their periphery are also well known. Multiple curved sheaves were utilized for belt transmissions, and attempts have been made to provide multiple tracks or guides for rollers or ball bearings.

The novel feature of the herein device is that it is accurage both on a single track co-operating with the V-shaped groove in the middle of the wheel as well as a track in engagement with the outside inclined surfaces of the wheel. Another feature of the invention is the eccentric adjustment whereby precise alignment can be accomplished between the wheel and the track. Another feature of the invention is the provision of interchangeable tracks which have a mounting surface to accurately locate the inclined faces of the track in the precise position for said wheels.

BRIEF DESCRIPTION OF THE DRAWINGS

FIG. 6 is a side view of a typical so-called inboard mounting of a pair of wheels guiding tracks on the outside of the pair of wheels.

FIG. 7 is a fragmental plan view partly in section on lines 7—7 of FIG. 6.

FIG. 8 is a partly sectional side view of a pair of wheels with the guide tracks between the wheels.

FIG. 9 is a fragmental plan view partly in section on lines 9—9 of FIG. 8.

DETAILED DESCRIPTION

Each guide wheel 1 is formed with cross-sectional V-shaped guide peripheries side by side so as to form a groove with the sides at ninety degrees, and to form an outer inclined guide surface 3 on each side respectively at right angles with the adjacent inner inclined surface 2 of the wheel 1.

Figure 1:
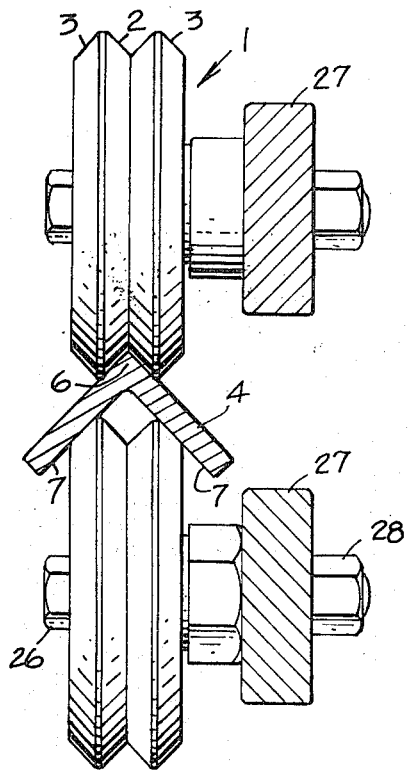
FIG. 1 shows a pair of wheels separately mounted illustrating the co-operation of the guide wheel both on the apex and on the inside of a right angle guide track.

The track for the wheel may take several forms, but in each case there must be provided on the track two surfaces at right angles to one another so as to fit either on the outside surfaces 3 of the wheel or into the inside surfaces 2 of the wheel 1. For instance, in FIG. 1 is illustrated an angle iron 4 the outside corner 6 of which fits into the middle V shaped groove against the inside inclined surfaces 2, while the inside faces 7 of the angle iron 4 fit over the outside inclined surfaces 3 of the wheel 1.

Figure 2:
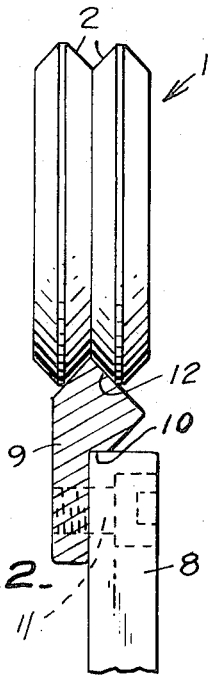
FIG. 2 is a guide wheel and cross-sectional view of a guide track mounted on a vertical stationary member.

As shown in FIG. 2, for attachment on a perpendicular member 8, a track bracket 9 is suitably secured such as by a set screw 11 to the top of the perpendicular member 8. The top of the bracket 9 has a pair of right angle surfaces forming an exterior V-shaped track 12 fitting against the inside inclined faces 2 of the wheel 1. The flange of the bracket 9 is so formed that the apex of the V-shaped track 12 is in registry with the outside edge of the support 8.

Figure 3:
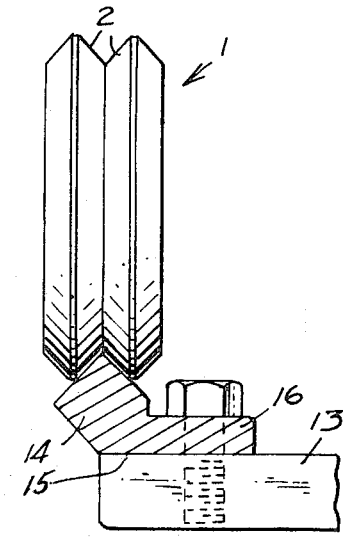
FIG. 3 is a guide wheel on a track on a horizontal member.

In FIG. 3 there is illustrated the application of a track to a horizontal support 13. The track 14 is formed to fit against the inside inclined faces 2 of the wheel 1 but a flange 16 extends from the track substantially at right angles to the vertical axis of the track rail 14. The flange 16 is bolted to the support 13.

Figure 4:
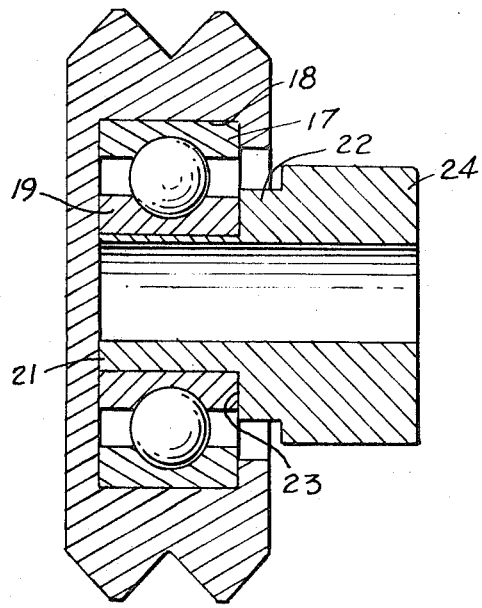
FIG. 4 is a sectional view of the guide wheel mounted on an eccentric mounting.
Figure 5:
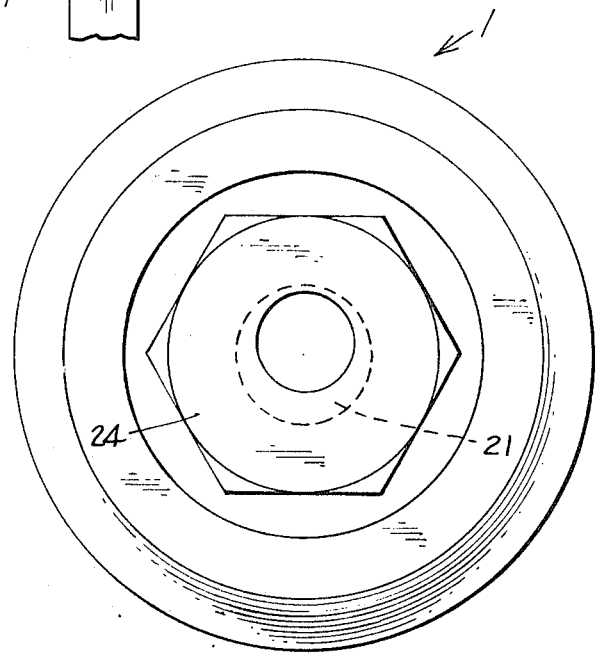
FIG. 5 is a front view of the wheel with an eccentric nut bushing.

One of the important features of the invention is the accurate clearances to be determined in positioning the axis of the wheel 1. Each wheel has therein a suitable antifriction bearing such as illustrated by the ballbearing shown in FIG. 4, wherein the outer race of the ballbearing is fixed in a circular recess 18. In the inner race 19 of the ballbearing is provided an eccentric bushing 21. On the outside of the bushing 21 is a cylindrical shank 22 which forms a shoulder 23 to bear against the adjacent face of the inner race 19. On the outside of the shank 22 is a head 24 which is preferably hexagonal as shown in FIG. 5. As indicated in FIG. 1, a bolt 26 extends through the bushing so that the portion of the bolt up to the mounting support 27 is smooth. The head of the bolt 26 bears against the inner race 19 and a nut 28 at the other end of the bolt is tightened against the support 27 so as to clamp tightly the bushing 24 and the inner race 19 in the adjusted position so as to permit free rotation of the outer race 18 and the wheel 1. It is to be understood that the outer race may be formed integrally within the material of the wheel 1 itself.

In the illustration shown in FIGS. 6 and 7, who wheels 1 are supported adjacent to opposite parallel tracks 14 of the type described in FIG. 3. This illustrates that the track 14 has three sides at right angles to one another forming a suitable V-shaped track for the wheel 1 in perpendicular position, as shown in FIG. 3, or in a horizontal position as illustrated in FIGS. 6 and 7.

The mounting on the eccentric bushing permits the proper shifting of the axis of the wheels relatively to one another and relatively to the adjacent tracks 14, so that as the superstructure 31 travels relatively to the wheel support base 32, or vice versa, the traveling is always in true alignment on the respective tracks 14.

In FIGS. 8 and 9 a modification of this structure is shown by providing on the base 33 a central mounting block 34 on which the flanges 16 of the tracks 14 are mounted so that the side V-shaped tracks of the tracks 14 face oppositely outwardly from the center. The superstructure 36 supports the wheels 1 in precise rolling engagement on the outside of the tracks 14 so that the superstructure 36 straddles the mounting block 34.

There are several variations in which the inside and outside inclined traveling surfaces of the wheel can be utilized in combination with V-shaped track structures and in each case the wheels can be precisely adjusted in the correct clearance by the adjustment of the eccentric bushing 21.

It is also important that the mounting surfaces of the respective tracks in all the forms be accurately located with respect to the apex of the particular track. For instance, the height of the track or the distance between the mounting shoulder 10 of the track in FIG. 2 and the apex of the track is held to a close tolerance whereby the tracks in the particular application are interchangeable and accurate. The same applies to the mounting surface 15 in the application shown in FIG. 3 and the respective mounting surfaces in the forms shown in FIGS. 6 and 8. In each instance the tracks are interchangeable and replaceable in a constant correctly and precisely adjusted position on the respective machines.

I claim:

1. A guide wheel for a rail comprising
   a guide wheel body,
   a pair of inclined peripheral inside walls converging inwardly and toward the middle of the width of said wheel body to form an annular guide channel of substantially V-shaped cross-section,
   a peripheral outside wall adjacent each inside wall forming cross-sectionally a substantially V-shaped radially outward apex with the adjacent inside wall,
   the inclosed angle between the pair of inside walls, and between each inside wall and the adjacent outside wall being substantially ninety degrees, thereby to selectively ride on a guide rail between the said pair of inside walls or straddling said pair of outside walls.

2. The guide wheel for a rail defined in claim 1, and said guide rail being formed with inclined sides converging to an apex substantially at right angles.

3. The guide wheel and track defined in claim 2, and the rail formed by said inclined sides of said track straddling said wheel and fitting over the inclined outside walls of said guide wheel.

4. The guide wheel defined in claim 1, and
antifriction bearing means in said wheel,
a bearing support in said bearing means having an eccentric hole therethrough,
a mounting element axially through said eccentric role of said bearing support for mounting said bearing support in selected eccentric position relatively to said mounting means.

5. The guide wheel defined in claim 1, and
parallel pairs of said rails facing one another,
a guide wheel in engagement with each rail,
a support for the guide wheels between said pairs of rails,
mounting means for mounting each wheel on said support, and
journal means for each wheel adjustable eccentrically relatively to said mounting means for adjusting the position of said wheels relatively to the respective rails and relatively to one another.

6. The guide wheel defined in claim 1, and
said rail being formed with three intersecting inclined sides converging to two parallel apices at right angles to one another.

* * * * *